(12) United States Patent
Hubert

(10) Patent No.: US 6,626,089 B1
(45) Date of Patent: Sep. 30, 2003

(54) COOKING AND SMOKING APPARATUS

(76) Inventor: Leroy Hubert, 1136 N. 48th St., Baton Rouge, LA (US) 70802

( * ) Notice: Subject to any disclaimer, the term of this patent is extended or adjusted under 35 U.S.C. 154(b) by 0 days.

(21) Appl. No.: 10/194,175

(22) Filed: Jul. 11, 2002

(51) Int. Cl.[7] .......................... A47J 37/00; A47J 37/04; A47J 37/07
(52) U.S. Cl. .............................. 99/339; 99/340; 99/448; 99/482
(58) Field of Search .......................... 99/330, 339, 340, 99/352–355, 400, 401, 444–450, 481, 482; 126/25 R, 9 R, 41 R

(56) References Cited

U.S. PATENT DOCUMENTS

| | | | | |
|---|---|---|---|---|
| 3,559,564 A | * | 2/1971 | Turner et al. | 99/332 |
| 3,709,142 A | * | 1/1973 | Peterson | 99/470 X |
| 3,713,846 A | * | 1/1973 | Turner et al. | 99/340 X |
| 4,094,295 A | * | 6/1978 | Boswell et al. | 99/446 X |
| 4,300,444 A | * | 11/1981 | Muse | 99/448 |
| 4,392,419 A | * | 7/1983 | Bonny | 99/339 |
| 5,097,759 A | * | 3/1992 | Vilgrain et al. | 99/483 X |
| 5,123,337 A | * | 6/1992 | Vilgrain et al. | 99/340 X |
| 5,575,198 A | * | 11/1996 | Lowery | 99/446 X |
| 5,741,536 A | * | 4/1998 | Mauer et al. | 426/281 X |
| 5,767,487 A | * | 6/1998 | Tippmann | 99/472 X |

* cited by examiner

Primary Examiner—Timothy F. Simone

(57) ABSTRACT

A cooking and smoking apparatus having a housing that has an upper section and a firebox section. A drawer-like meat rack is slideably connected to the housing upper section. A coal rack is connected to the housing firebox section for holding charcoal. A drain is connected to the housing firebox section. The drain allows slow draining of water from wood chips placed in the housing firebox section. A vent is connected to the housing firebox section. The vent is capable of variable flow for regulating the burn rate of charcoal and wood chips.

20 Claims, 3 Drawing Sheets

COOKING AND SMOKING APPARATUS

BACKGROUND OF THE INVENTION

1. Field of the Invention

The present invention relates to a cooking and smoking apparatus for use in connection with cooking devices. The cooking and smoking apparatus has particular utility in connection with charcoal smoker and cooking device.

2. Description of the Prior Art

Cooking and smoking apparatuses are desirable for use in cooking meats and vegetables out of doors. Many people cook out of doors during recreational activities so as not to be separated from party guests. A cooker and smoker was sought that would automatically soak and add wood chips to the firebox to burn in a pre-determined fashion.

The use of cooking devices is known in the prior art. For example, U.S. Pat. No. 4,300,444 to Muse discloses a cooker support system that has a cylindrical housing with a removable domed top closure, and supported by legs radially spaced around the body. The apparatus has a heat source located near the bottom of the housing and resting on top of the supporting legs. The water pan is located above the heat source and one or more grills are located above the water pan. The grills and the water pan are supported by hanger structures that engage the water pan and have integral loops forming planes of support for the grills. However, the Muse '444 patent does not include a drain pipe and venting port for automatically soaking wood chips and periodically exposing them to the fire box for forming pre-determined times of smoking.

Similarly, U.S. Pat. No. 4,094,295 to Boswell et al discloses a charcoal and water smoker and cooker that includes a generally cylindrical body supporting a water pan. One or more supporting grilles with a base pan support the main body and also support a charcoal liner or pan for receiving a quantity of charcoal briquettes. The upper end of the main body is closed by a dome having a combined handle and heat indicator incorporated therein at the apex thereof. The main body is provided with a pair of diametrically opposed handles which enables the main body along with the water pan, grilles and dome to be lifted off of the base pan and charcoal liner in order to enable the charcoal to be replenished if necessary. The water pan and grill or grilles are supported interiorly of the main body by vertically spaced radially inwardly extending supporting clips. However, the Boswell et al '295 patent does not include a drain pipe and venting port for automatically soaking wood chips and periodically exposing them to the fire box for forming pre-determined times of smoking.

Lastly, U.S. Pat. No. 4,392,419 to Bonny discloses a cooking and smoking apparatus that comprises a housing enclosing the cooking and smoking space. A perforated shelf is inside the housing in the upper portion thereof for supporting materials to be cooked or smoked. A slideable drawer capable of being selectively positioned from entirely within the housing to entirely outside the housing an serving as a fire box with an adjustable damper, and with an outlet in the rear portion thereof for the passage of smoke into the internal space of the housing, and a smoke outlet in the housing upper portion. However, the Bonny '419 patent does not include a drain pipe and venting port for automatically soaking wood chips and periodically exposing them to the fire box for forming pre-determined times of smoking.

While the above-described devices fulfill their respective, particular objectives and requirements, the aforementioned patents do not describe a cooking and smoking apparatus that allows charcoal smoker and cooking device. The Muse '444, Boswell et al '295 and Bonny '419 patents make no provision for a drain pipe and venting port for automatically soaking wood chips and periodically exposing them to the fire box for forming pre-determined times of smoking.

Therefore, a need exists for a new and improved cooking and smoking apparatus that can be used for charcoal smoker and cooking device. In this regard, the present invention substantially fulfills this need. In this respect, the cooking and smoking apparatus according to the present invention substantially departs from the conventional concepts and designs of the prior art, and in doing so provides an apparatus primarily developed for the purpose of charcoal smoker and cooking device.

SUMMARY OF THE INVENTION

In view of the foregoing disadvantages inherent in the known types of cooking devices now present in the prior art, the present invention provides an improved cooking and smoking apparatus, and overcomes the above-mentioned disadvantages and drawbacks of the prior art. As such, the general purpose of the present invention, which will be described subsequently in greater detail, is to provide a new and improved cooking and smoking apparatus and method which has all the advantages of the prior art mentioned heretofore and many novel features that result in a cooking and smoking apparatus which is not anticipated, rendered obvious, suggested, or even implied by the prior art, either alone or in any combination thereof.

To attain this, the present invention essentially comprises a housing that has an upper section and a firebox section. A drawer-like meat rack is slideably connected to the housing upper section. A coal rack is connected to the housing firebox section for holding charcoal. A drain is connected to the housing firebox section. The drain allows slow draining of water from wood chips placed in the housing firebox section. A vent is connected to the housing firebox section. The vent is capable of variable flow for regulating the burn rate of charcoal and wood chips.

There has thus been outlined, rather broadly, the more important features of the invention in order that the detailed description thereof that follows may be better understood and in order that the present contribution to the art may be better appreciated.

The invention may also include a stove shelf, a butane burner, a control valve, a butane gas connector, a gas bottle strap, a rack door, a door stop, a smoke stack, a drip pan, a drip pan door, a vent door, a tray, a frame and a plurality of wheels. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cooking and smoking apparatus that has all of the advantages of the prior art cooking devices and none of the disadvantages.

It is another object of the present invention to provide a new and improved cooking and smoking apparatus that may be easily and efficiently manufactured and marketed.

An even further object of the present invention is to provide a new and improved cooking and smoking apparatus that has a low cost of manufacture with regard to both materials and labor, and which accordingly is then susceptible of low prices of sale to the consuming public, thereby making such cooking and smoking apparatus economically available to the buying public.

Still another object of the present invention is to provide a new cooking and smoking apparatus that provides in the apparatuses and methods of the prior art some of the advantages thereof, while simultaneously overcoming some of the disadvantages normally associated therewith.

Even still another object of the present invention is to provide a cooking and smoking apparatus for charcoal smoker and cooking device.

Lastly, it is an object of the present invention is to provide a cooking and smoking apparatus for including a drain pipe and venting port for automatically soaking wood chips and periodically exposing them to the fire box for forming pre-determined times of smoking.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
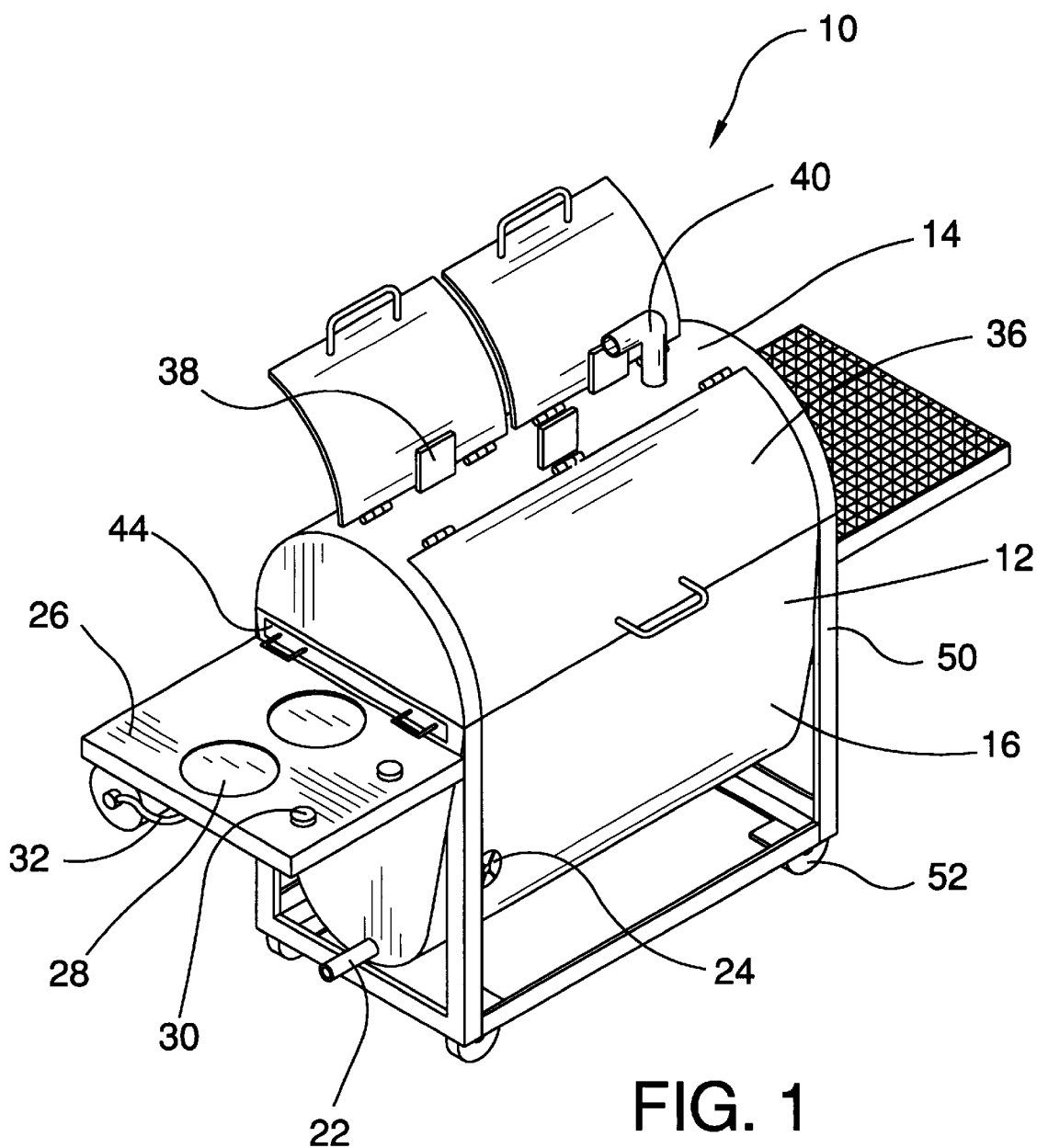
FIG. 1 is a front perspective view of the preferred embodiment of the cooking and smoking apparatus constructed in accordance with the principles of the present invention.

Referring now to the drawings, and particularly to FIGS. 1–4, a preferred embodiment of the cooking and smoking apparatus of the present invention is shown and generally designated by the reference numeral 10.

In FIG. 1, a new and improved cooking and smoking apparatus 10 of the present invention for charcoal smoker and cooking device is illustrated and will be described. More particularly, the cooking and smoking apparatus 10 has a housing 12 that has an upper section 14 and a firebox section 16. A drain 22 is connected to the housing firebox 16 section. The drain 22 is in hydraulic communication with the housing 12. The drain 22 is capable of variable flow.

The drain 22 is for slowly draining water from wood chips placed in the housing firebox section 16. A vent 24 is connected to the housing firebox section 16. The vent 24 is in pneumatic communication with the housing 12. The vent 24 is capable of variable flow for regulating the burn rate of charcoal and wood chips. A stove shelf 26 is connected to the housing 12. A butane burner 28 is connected to the stove shelf 26. A control valve 30 is connected to the butane burner 28. A rack door 36 is rotatably connected to the housing upper section 14. A doorstop 38 is connected to the housing upper section 14 for stopping the movement of the rack door 36. A smokestack 40 is connected to the housing upper section 14. The smokestack 40 is in pneumatic communication with the housing 12. A vent door 46 is rotatably connected to the housing firebox section 16. A tray 48 is connected to the housing 12. A frame 50 is connected to the housing 12. A plurality of wheels 52 is rotatably connected to the frame 50.

Figure 2:
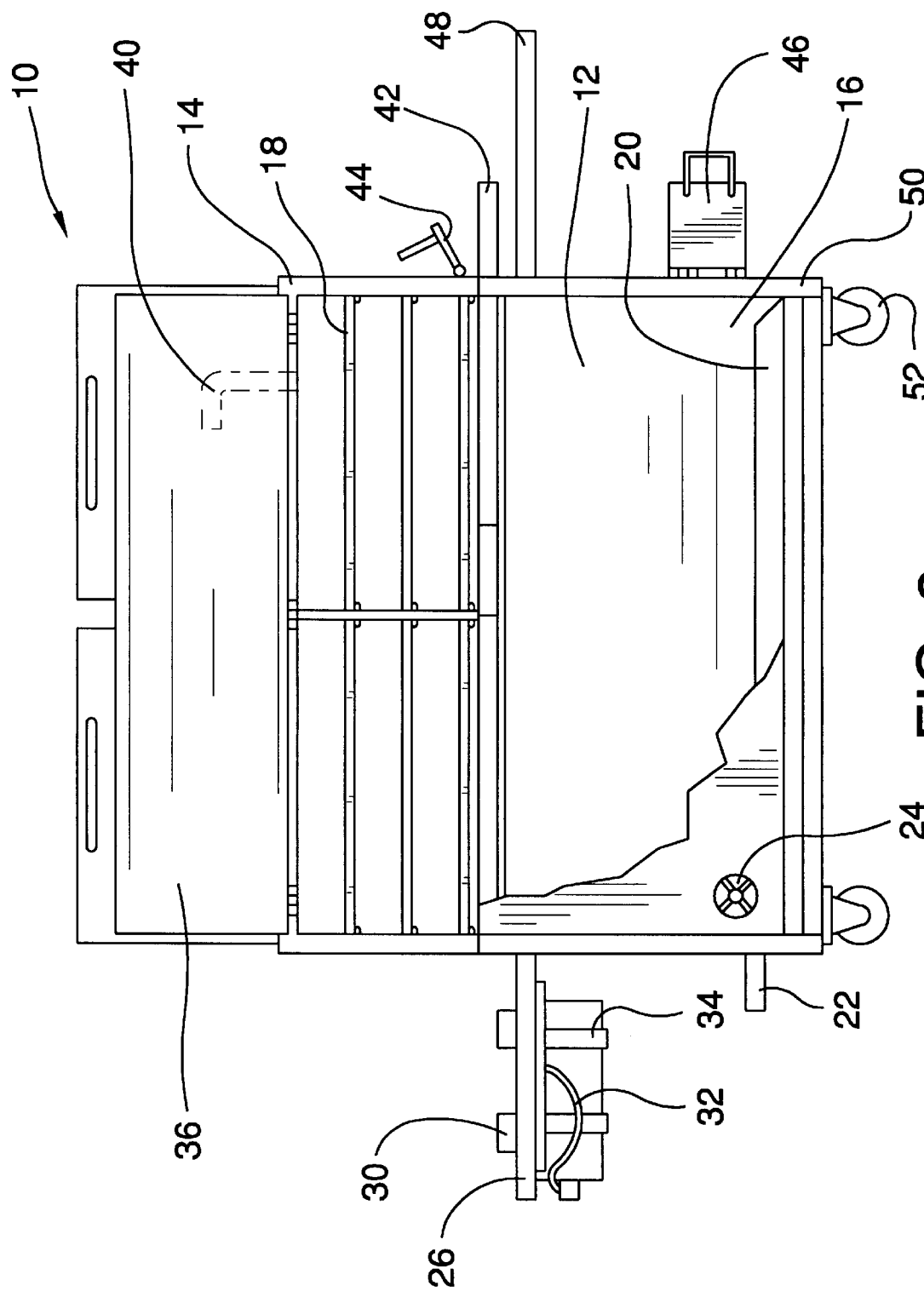
FIG. 2 is a front side view of the cooking and smoking apparatus of the present invention.

In FIG. 2, the cooking and smoking apparatus 10 is illustrated and will be described. The cooking and smoking apparatus 10 has housing 12 that has the upper section 14 and the firebox section 16. A drawer-like meat rack 18 is slideably connected to the housing upper section 14. A coal rack 20 is connected to the housing firebox section 16 for holding charcoal. The drain 22 is connected to the housing firebox 16 section. The drain 22 is in hydraulic communication with the housing 12. The drain 22 is capable of variable flow. The drain 22 is for slowly draining water from wood chips placed in the housing firebox section 16. The vent 24 is connected to the housing firebox section 16. The vent 24 is in pneumatic communication with the housing 12. The vent 24 is capable of variable flow for regulating the burn rate of charcoal and wood chips. The stove shelf 26 is connected to the housing 12. The butane burner 28 is connected to the stove shelf 26. The control valve 30 is connected to the butane burner 28. A butane gas connector 32 is connected to the control valve 30. A strap 34 is for detachably connecting the butane gas bottle to the stove shelf 26. The rack door 36 is rotatably connected to the housing upper section 14. The doorstop 38 is connected to the housing upper section 14 for stopping the movement of the rack door 36. The smokestack 40 is connected to the housing upper section 14. The smokestack 40 is in pneumatic communication with the housing 12. A drip pan 42 is slideably connected to the housing 12. A drip pan door 44 is rotatably connected to the housing 12. The vent door 46 is rotatably connected to the housing firebox section 16. The tray 48 is connected to the housing 12. The frame 50 is connected to the housing 12. The plurality of wheels 52 is rotatably connected to the frame 50.

Figure 3:
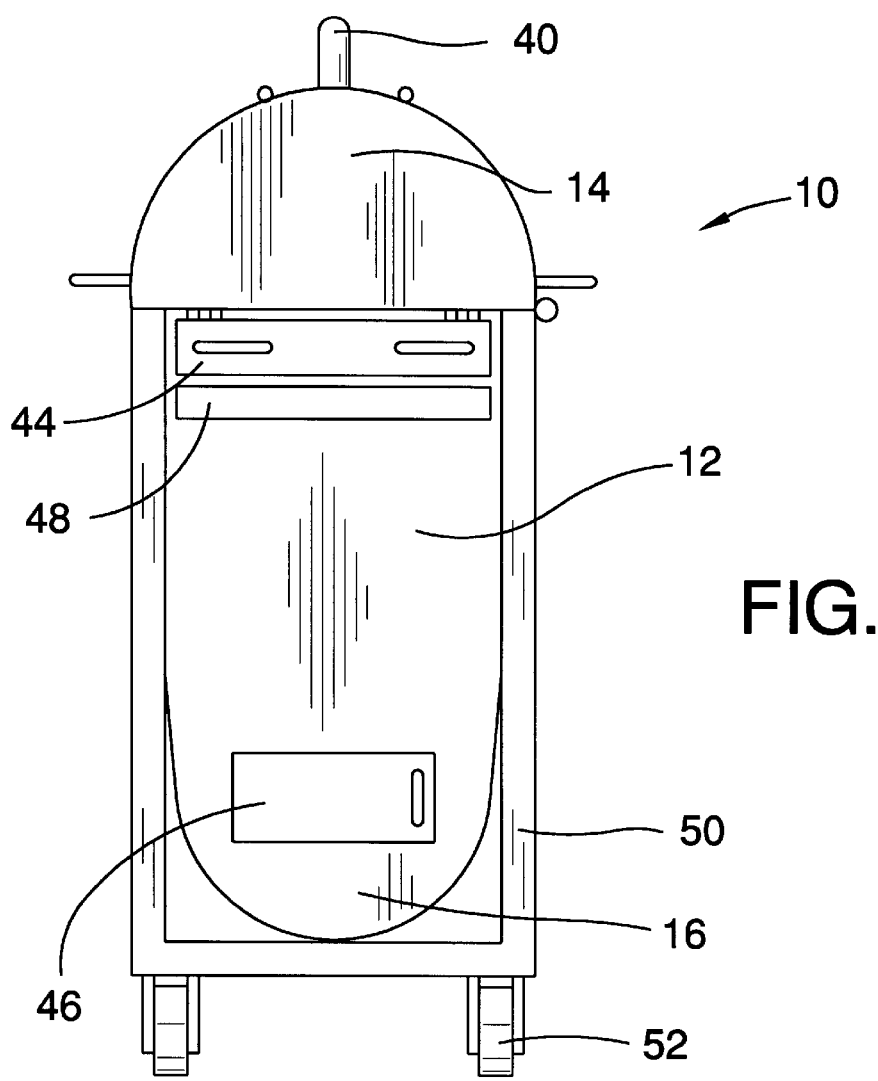
FIG. 3 is a right side view of the cooking and smoking apparatus of the present invention.

In FIG. 3, the cooking and smoking apparatus 10 is illustrated and will be described. The cooking and smoking apparatus 10 has housing 12 that has the upper section 14 and the firebox section 16. The smokestack 40 is connected to the housing upper section 14. The smokestack 40 is in pneumatic communication with the housing 12. The vent door 46 is rotatably connected to the housing firebox section 16. The drip pan door 44 is rotatably connected to the housing 12. The tray 48 is connected to the housing 12. The frame 50 is connected to the housing 12. The plurality of wheels 52 is rotatably connected to the frame 50.

Figure 4:
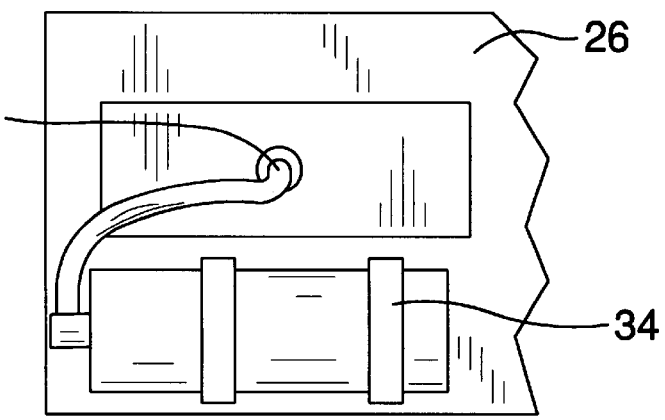
FIG. 4 is a bottom view of the gas burners of the cooking and smoking apparatus of the present invention.

In FIG. 4, the cooking and smoking apparatus 10 is illustrated and will be described. The stove shelf 26 is connected to the housing 12. The butane burner 28 is connected to the stove shelf 26. The control valve 30 is connected to the butane burner 28. The butane gas connector 32 is connected to the control valve 30. The strap 34 is for detachably connecting the butane gas bottle to the stove shelf 26.

While a preferred embodiment of the cooking and smoking apparatus has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy metal such as steel may be used instead of the iron plate described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A cooking and smoking apparatus comprising:
    a housing having an upper section and a firebox section;
    a drawer-like meat rack slideably connected to said housing upper section;
    a coal rack connected to said housing firebox section for holding charcoal;
    a drain connected to said housing firebox section, said drain in hydraulic communication with said housing, said drain for slowly draining water from wood chips placed in the housing firebox section; and
    a vent connected to said housing firebox section, said vent in pneumatic communication with said housing, said vent capable of variable flow for regulating the burn rate of charcoal and wood chips.
2. The cooking and smoking apparatus of claim 1 further comprising:
    a stove shelf connected to said housing;
    a butane burner connected to said stove shelf;
    a control valve connected to said butane burner;
    a butane gas connector connected to said control valve; and
    a strap for detachably connecting a butane gas bottle to the stove shelf.
3. The cooking and smoking apparatus of claim 1 further comprising:
    a rack door rotatably connected to said housing upper section.
4. The cooking and smoking apparatus of claim 3 further comprising:
    a door stop connected to said housing upper section for stopping the movement of said rack door.
5. The cooking and smoking apparatus of claim 1 further comprising:
    a smoke stack connected to said housing upper section, said smoke stack in pneumatic communication with said housing.
6. The cooking and smoking apparatus of claim 1 further comprising:
    a drip pan slideably connected to said housing; and
    a drip pan door rotatably connected to said housing.
7. The cooking and smoking apparatus of claim 1 further comprising:
    a vent door rotatably connected to said housing firebox section.
8. The cooking and smoking apparatus of claim 1 further comprising:
    a tray connected to said housing.
9. The cooking and smoking apparatus of claim 1 further comprising:
    a frame connected to said housing.
10. The cooking and smoking apparatus of claim 9 further comprising:
    a plurality of wheels rotatably connected to said frame.
11. A cooking and smoking apparatus comprising:
    a housing having an upper section and a firebox section;
    a drawer-like meat rack slideably connected to said housing upper section;
    a coal rack connected to said housing firebox section for holding charcoal;
    a drain connected to said housing firebox section, said drain in hydraulic communication with said housing, said drain for slowly draining water from wood chips placed in the housing firebox section;
    a vent connected to said housing firebox section, said vent in pneumatic communication with said housing, said vent capable of variable flow for regulating the burn rate of charcoal and wood chips;
    a stove shelf connected to said housing;
    a butane burner connected to said stove shelf;
    a control valve connected to said butane burner;
    a butane gas connector connected to said control valve; and
    a strap for detachably connecting a butane gas bottle to the stove shelf.
12. The cooking and smoking apparatus of claim 11 further comprising:
    a rack door rotatably connected to said housing upper section.
13. The cooking and smoking apparatus of claim 12 further comprising:
    a door stop connected to said housing upper section for stopping the movement of said rack door.
14. The cooking and smoking apparatus of claim 13 further comprising:
    a smoke stack connected to said housing upper section, said smoke stack in pneumatic communication with said housing.
15. The cooking and smoking apparatus of claim 14 further comprising:
    a drip pan slideably connected to said housing; and
    a drip pan door rotatably connected to said housing.
16. The cooking and smoking apparatus of claim 15 further comprising:
    a vent door rotatably connected to said housing firebox section.

17. The cooking and smoking apparatus of claim 16 further comprising:

a tray connected to said housing.

18. The cooking and smoking apparatus of claim 17 further comprising:

a frame connected to said housing.

19. The cooking and smoking apparatus of claim 18 further comprising:

a plurality of wheels rotatably connected to said frame.

20. A cooking and smoking apparatus comprising:

a housing having an upper section and a firebox section;

a drawer-like meat rack slideably connected to said housing upper section;

a coal rack connected to said housing firebox section for holding charcoal;

a drain connected to said housing firebox section, said drain in hydraulic communication with said housing, said drain capable of variable flow, said drain for slowly draining water from wood chips placed in the housing firebox section;

a vent connected to said housing firebox section, said vent in pneumatic communication with said housing, said vent capable of variable flow for regulating the burn rate of charcoal and wood chips;

a stove shelf connected to said housing;

a butane burner connected to said stove shelf;

a control valve connected to said butane burner;

a butane gas connector connected to said control valve;

a strap for detachably connecting a butane gas bottle to the stove shelf;

a rack door rotatably connected to said housing upper section;

a door stop connected to said housing upper section for stopping the movement of said rack door;

a smoke stack connected to said housing upper section, said smoke stack in pneumatic communication with said housing;

a drip pan slideably connected to said housing;

a drip pan door rotatably connected to said housing;

a vent door rotatably connected to said housing firebox section;

a tray connected to said housing;

a frame connected to said housing; and a plurality of wheels rotatably connected to said frame.

* * * * *